United States Patent [19]

Lowery

[11] Patent Number: 5,039,114
[45] Date of Patent: Aug. 13, 1991

[54] COLLAR NUT AND THRUST RING

[75] Inventor: Guy B. Lowery, Aiken, S.C.

[73] Assignee: The United States of America as represented by the United States Department of Energy, Washington, D.C.

[21] Appl. No.: 340,824

[22] Filed: Apr. 20, 1989

[51] Int. Cl.$^5$ .......................... F16J 15/26; F16J 15/34
[52] U.S. Cl. .................................. 277/110; 277/81 R; 277/102; 277/136
[58] Field of Search ................. 277/5, 102, 110, 81 R, 277/167.5, 112, 105, 108, 187, 136, 137, 123–125

[56] References Cited

U.S. PATENT DOCUMENTS

| 599,852 | 3/1898 | Lufkin . | |
| 931,128 | 8/1909 | Keith | 277/112 |
| 1,586,105 | 5/1926 | Moulet | 277/105 |
| 1,662,707 | 3/1928 | Hosmer . | |
| 1,703,160 | 2/1929 | Morlang et al. | 277/108 |
| 1,722,623 | 7/1929 | Bramwell | 277/112 X |
| 1,798,158 | 3/1931 | Hazard . | |
| 1,814,479 | 7/1931 | Metcalf, Jr. | 277/112 X |
| 1,968,999 | 8/1934 | Fleming | 277/112 |
| 2,009,091 | 7/1935 | Martin et al. | 277/112 X |
| 2,021,745 | 11/1935 | Pfefferle et al. | 277/110 |
| 2,061,693 | 11/1936 | Beaumier | 277/108 |
| 2,357,967 | 9/1944 | Paloncy | 288/3 |
| 2,425,662 | 8/1947 | Wolfram | 285/90 |
| 2,481,121 | 9/1949 | Kasten . | |
| 2,499,024 | 2/1950 | Hollyday, Jr. | 277/112 |
| 2,564,912 | 9/1951 | McKissick . | |
| 2,655,391 | 10/1953 | Atkins | 277/105 |
| 2,853,321 | 9/1958 | Davey | 277/105 |
| 3,331,609 | 7/1967 | Moran | 277/84 |
| 3,472,522 | 10/1969 | Winfrey | 277/105 |
| 3,559,539 | 2/1971 | Nagy | 277/187 X |
| 3,577,833 | 5/1971 | Skelton | 277/187 |
| 4,345,766 | 8/1982 | Turanti | 277/30 |
| 4,659,064 | 4/1987 | Scobie et al. | 277/105 |

FOREIGN PATENT DOCUMENTS

| 404942 | 3/1923 | Fed. Rep. of Germany | 277/112 |
| 0160464 | 12/1981 | Japan | 277/105 |
| 7189 | of 1891 | United Kingdom | 277/187 |
| 199250 | 3/1923 | United Kingdom | 277/110 |

Primary Examiner—Allan N. Shoap
Attorney, Agent, or Firm—Harold M. Dixon; Stephen D. Hamel; William R. Moser

[57] ABSTRACT

A collar nut comprises a hollow cylinder having fine interior threads at one end for threadably engaging a pump mechanical seal assembly and an inwardly depending flange at the other end. The flange has an enlarged portion with a groove for receiving an O-ring for sealing against the intrusion of pumpage from the exterior. The enlarged portion engages a thrust ring about the pump shaft for crushing a hard O-ring, such as a graphite O-ring. The hard O-ring seals the interior of the mechanical seal assembly and pump housing against the loss of lubricants or leakage of pumpage. The fine threads of the hollow cylinder provide the mechanical advantage for crushing the hard O-ring evenly and easily with a hand tool from the side of the collar nut rather than by tightening a plurality of bolts from the end and streamlines the exterior surface of the mechanical seal. The collar nut avoids the spatial requirements of bolt heads at the end of a seal and associated bolt head turbulence.

1 Claim, 2 Drawing Sheets

COLLAR NUT AND THRUST RING

BACKGROUND OF THE INVENTION

1. Field of the Invention and Contract Statement

The invention relates to collar nuts for mechanical seals for pumps.

2. Discussion of Background and Prior Art

Collar nuts for sealing pump shafts are well known in the art. However, collar nuts are reserved usually for adjusting the compression on a series of reeds or packing to form a seal between a machine housing and a reciprocating or rotating shaft. Typically the space between the pump housing and the pump shaft is fitted with packing in a stuffing box and retained with a cylindrical ring threadably fastened to the box. The packing is made of a soft, flexible material. The packing seal prevents lubricant or pumpage from escaping from the space between the pump shaft and the pump housing. In critical or unique applications, mechanical seals are used in place of packing due to their leak-free performance and reduced maintenance requirements.

In some applications, such as where a pump is to operate submerged in a liquid that is especially corrosive or radioactive, mechanical seals have become more elaborate and elastomeric seals have been supplanted by graphite seals. In the form of an O-ring, a graphite seal is very hard, much harder than an elastomeric material such as rubber. Usually the threaded collar nut, or cap nut, is replaced by a cap that has a plurality of bolts for fastening the cap and, as the bolts are sequentially torqued, for providing sufficient force to crush the graphite O-ring against the shaft to form a seal. In order to crush the O-ring properly, a bolt torquing sequence must be carefully and patiently followed.

Fitting and tightening a bolted collar nut can be difficult in a hazardous environment. For example, if the pump is in a radioactive or toxic area, the worker applying the bolted cap must wear protective clothing including a respirator. The length of time taken to torque the bolts in such an environment can become crucial.

If the pump is submerged in corrosive liquids or sludges, it is also important to seal in both directions, against the pumpage entering the pump housing or mechanical seal housing from without and against the lubricant leaving the shaft housing from within.

Finally, in some applications bolt heads themselves present problems. Bolt heads take up critical axial space that may be important since most pumps have limited axial space in which to install mechanical seals. Also, bolt heads, and indeed any surface feature of the exterior of the collar nut, may create turbulence which can adversely affect the integrity of the mechanical seal.

SUMMARY OF THE INVENTION

An object of the invention is to provide a collar nut and thrust ring for capping the end of a mechanical pump seal having a hard O-ring seal.

Another object of the invention is to provide a collar nut and thrust ring for sealing the end of a mechanical seal housing in both directions.

It is a further object of the invention to provide an effective seal for a mechanical seal housing that is quickly and easily attached with a hand tool.

It is a further object of the invention to provide a collar nut and thrust ring having a small axial dimension and smooth exterior surface in order to save space for a mechanical seal and reduce turbulence while in operation so as not to jeopardize the hydraulic stability of the mechanical seal.

To achieve the foregoing and other objects and in accordance with the purpose of the invention, as embodied and broadly described herein, the invention is a collar nut for crushing a hard O-ring comprising a hollow cylindrical body having fine interior threads for threadably engaging a mechanical seal assembly and having a inwardly depending flange with a circular opening for a shaft to pass therethrough and an enlarged portion at the most inward part of the flange, the enlarged portion chamfered and having a shallow peripheral groove to receive a first O-ring for sealing the interior of the mechanical seal housing against intrusion of pumpage. Exterior, shallow slots on the collar nut periphery receive the jaws of a hand tool for tightening.

An integral part of the collar nut, or in an alternative embodiment, a separate, adjacent part, is a thrust ring for bearing on the hard O-ring, such as a graphite O-ring. The thrust ring is in the form of a hollow cylinder surrounding and slightly larger than the pump shaft and having one end abutting the enlarged portion of the collar nut and an opposing end abutting the hard O-ring, so that, as the collar nut is gradually, threadably advanced, the enlarged portion of the collar nut bears on the thrust ring which in turn bears on the hard O-ring.

It is understood that the balance of the mechanical seal and second O-ring are not part of the instant invention.

The collar nut and thrust ring are easily and quickly attached, tightening from the side rather than the end as in the case with a cap having a plurality of bolts, and crush the hard O-ring evenly and easily without the need for sequential torquing of multiple bolts.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

Figure 1:
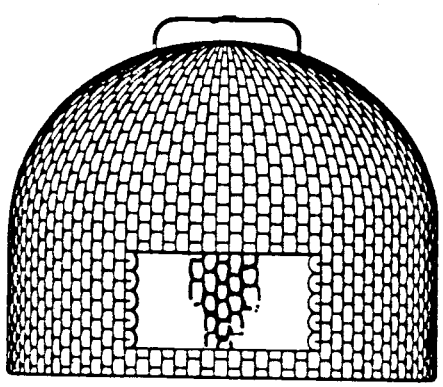
FIG. 1 is a side cross sectional view of the collar nut and thrust ring according to the present invention.

Referring to FIG. 1 the present invention comprises a collar nut 10 and thrust ring 12 shown as two separate, cooperating units for crushing a hard O-ring 14 but it will be obvious that in some applications they may be formed as one integral unit.

Figure 4:
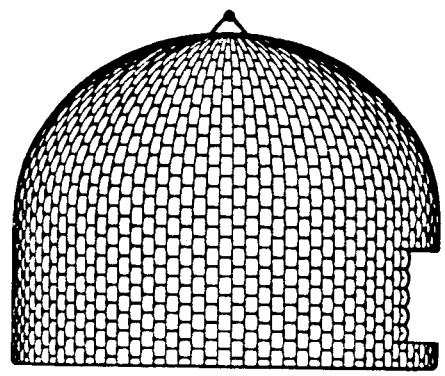
FIG. 4 is a partial cross sectional side view of a pump shaft seal showing the collar nut and thrust ring relative to a typical pump shaft and mechanical seal housing in one application according to the present invention.
Figure 5:
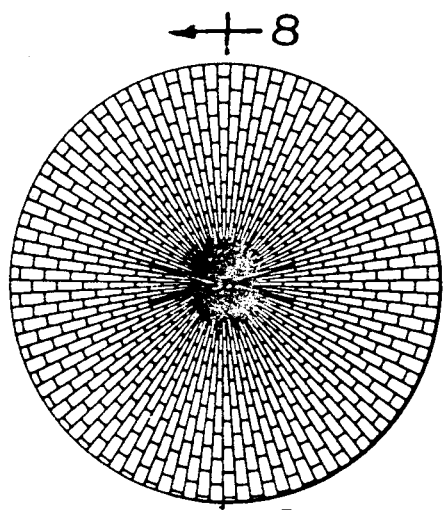
Figure 6:
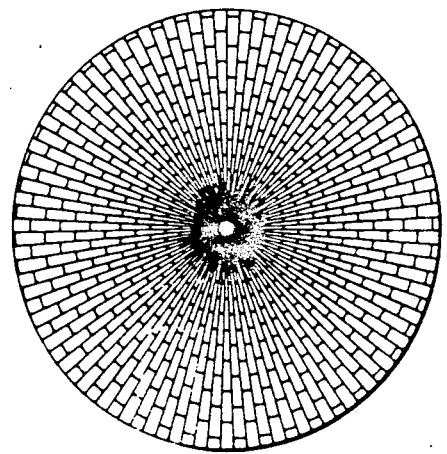
Figure 7:
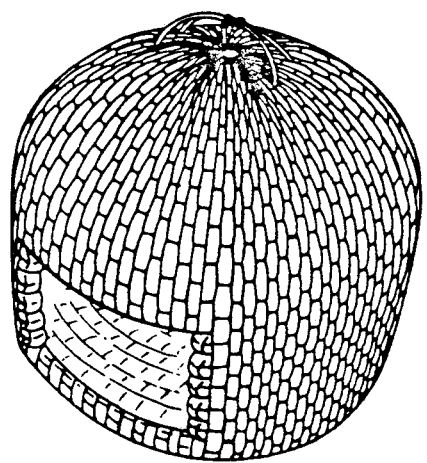
Figure 8:
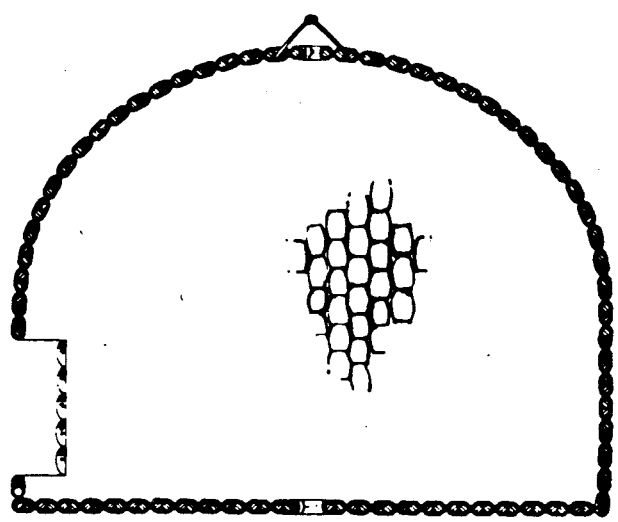

Collar nut 10 comprises a first hollow cylinder 16 having at one end an inwardly depending flange 18 defining a hole 20 for a pump shaft 22 to pass therethrough. The interior 24 of the other end of collar nut 10 threadably engages a mechanical seal assembly 26 (as shown in FIG. 4). The series of threads 28 of collar nut 10 are very fine, having a small pitch, for exceptionally good mechanical advantage in advancing collar nut 10 in the axial direction. The larger surface area of series of threads 28 improves the frictional holding of collar nut 10 to mechanical seal assembly 26.

Figure 2:
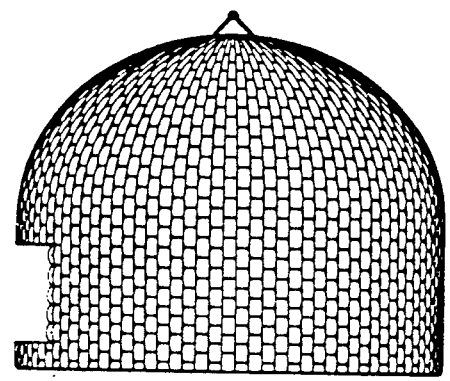
FIG. 2 is a detailed cross sectional view of the present invention showing the groove for the first O-ring.

Inwardly depending flange 18 has an enlarged portion 30 at its most inward end. Enlarged portion 30 stiffens collar nut 10 against the resistance of hard O-ring 14 to the advancing collar nut 10 and has a first face 32 in close tolerance fit with respect to pump shaft 22. First face 32, as best shown in FIG. 2 has a groove 34 formed in the periphery thereof for receiving a second O-ring 36 to seal against pump shaft 22 to prevent the intrusion of pumpage to the interior of mechanical seal assembly 26. Groove 34 has a first wall 38 interior to groove 34 and a second wall 40 exterior to groove 34. Second wall 40 extends to first face 32 at pump shaft 22; first wall 38 does not extend to pump shaft 22 but is spaced apart. An exterior face 42 of enlarged portion 30 of collar nut 10 is chamfered at 44 for ease in accessing groove 34.

Enlarged portion 30 has a second face 48 adjacent and at right angles to first face 32 abutting thrust ring 12. Thrust ring 12 comprises a second hollow cylinder 50 having an interior 52 adjacent pump shaft 22 and a short, outwardly depending flange 54 abutting second face 48. In the particular embodiment shown in FIG. 4, thrust ring 12 has cutout portions 56 to allow set screws 58 to seat against pump shaft 22. Thus, thrust ring 12, in this embodiment is designed to remain stationary as collar nut 10 is threaded.

Preferably, there is a sufficient mechanical advantage provided by the pitch of series of threads 28 so that an operator, exerting a reasonable amount of manual force using a spanner wrench or similar tool on collar nut 10 can cause it to crush hard O-ring 14; most preferably series of threads 28 has a pitch of 1.5 millimeters and meet DIN standard M98.

Furthermore, the improvement in mechanical advantage of the present invention over a bolt arrangement, because of the fine threads and the radial leverage provided when force is applied at a greater distance from hard O-ring 14, reduces effort and time required to install collar nut 10.

Figure 3:
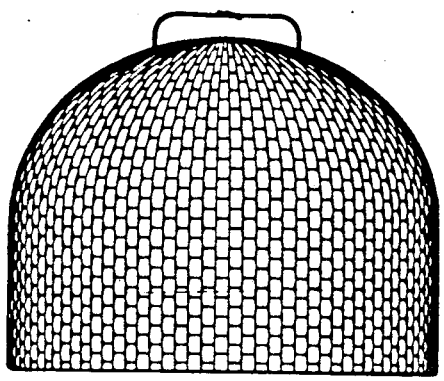
FIG. 3 is a top plan view of the collar nut according to the present invention.

Most importantly, because collar nut 10 and thrust ring 12 advance slowly by threading, variations in movement of their axis about the axis of the pump shaft 22 are slight and any point on collar nut 10 and thrust ring 12 advance along a path best described as a closely coiled helix. This gradual advance of the collar nut crushes hard O-ring 14 more evenly than by cross torquing a series of bolts, as with the present means of crushing a hard O-ring in a mechanical seal so equipped. Thus, a better seal and more easily obtained seal is achieved. Eliminating the bolt arrangement of the prior art also eliminates a source of turbulence in pump housing seals caused by bolt heads. The space taken up by bolt heads including the space for tightening and loosening the bolts is eliminated in the present invention. Also the present invention allows collar nut 10 to be tightened and loosened from the side. Mechanical seals can therefore be used in severe environments or critical situations where there previously was not enough axial space within the stuffing box to install a mechanical seal. In FIG. 3, collar nut 10 has shallow slits 60 to receive the jaws of a hand tool (not shown) for tightening or loosening.

FIG. 4 shows a portion of a typical pump shaft mechanical seal 62 having the present invention installed thereon. Pump shaft mechanical seal 62 comprises a rotating seal surface 64 and a non rotating seal surface 66. Rotating seal surface 64 glides against non rotating seal surface 66. Bellows 68 provide compressive force to keep rotating seal surface 64 and non rotating seal surface 66 in contact. A rotating shaft sleeve 70 engages shaft 22 and carries seal 62. A bellows O-ring 74 seals between shaft sleeve 70 and bellows 68, held in place by bellows mounting bolt 76. Mounting adaptor 78 is used to bolt the pump shaft seal 62 to the pump housing frame.

The foregoing description of preferred embodiments of the invention has been presented for purposes of illustration and description. It is not intended to be exhaustive or to limit the invention to the precise form disclosed, and obviouslY many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A collar nut for sealing the end of a mechanical seal assembly having a hard O-ring for sealing between a pump shaft housing and a pump shaft against loss of a lubricating fluid, said collar nut comprising
   a first hollow cylinder spaced apart from said shaft and having a periphery, a first end and a second end,
   said first end having a radially inwardly depending flange, said flange having an enlarged portion with a first face for engaging said shaft, said enlarged portion having
   a groove in said first face for receiving a second O-ring,
   an exterior surface chamfered to allow access to said groove for installing said second O-ring;
   said second end having a series of fine threads for engaging said mechanical seal assembly;
   at least two shallow slits in the periphery of said collar nut for receiving the jaws of a hand tool; and
   a thrust ring positioned between said enlarged portion and said hard O-ring for transferring force between said collar nut and said hard O-ring, said thrust ring having at least one cutout portion for a set screw to pass through said at least one cutout portion to said shaft so that said thrust ring turns with said shaft.

* * * * *